United States Patent
Ruggles et al.

Patent Number: 5,413,658
Date of Patent: May 9, 1995

[54] FOLDING PLATE ASSEMBLY FOR FABRICATING HONEYCOMB INSULATING MATERIAL

[75] Inventors: Bryan K. Ruggles, Salt Lake City; Cary L. Ruggles, Mendon, both of Utah

[73] Assignee: Newell Operating Company, Freeport, Ill.

[21] Appl. No.: 40,869

[22] Filed: Mar. 31, 1993

Related U.S. Application Data

[63] Continuation-in-part of Ser. No. 773,843, Oct. 7, 1991, Pat. No. 5,308,435, and a continuation-in-part of Ser. No. 870,574, Apr. 17, 1992.

[51] Int. Cl.6 .................................................. B31F 1/00
[52] U.S. Cl. ...................................... 156/204; 156/199; 156/443; 156/459; 156/461; 156/465; 493/405; 493/455; 493/417; 270/41
[58] Field of Search ............... 156/199, 200, 204, 443, 156/459, 483, 461, 463, 465; 493/405, 408, 416, 417, 436, 438, 446, 455, 456; 270/5, 16, 41; 53/116

[56] References Cited

U.S. PATENT DOCUMENTS 1,759,844  5/1930  Gudge et al.

Primary Examiner—David A. Simmons
Assistant Examiner—M. Curtis Mayes
Attorney, Agent, or Firm—Foley & Lardner

[57] ABSTRACT

Apparatus for folding a web of sheet material moving along a given linear path comprise three longitudinally spaced plates forming an overall slot having a base portion through which the central portion of the web passes, and short reversely curved slot portions at the ends of the base portion which join outer end slot portions which fold the opposite longitudinal edge portions of the web toward each other. The outermost of the plates having large aligned apertures whose margins fall along the outer margins of the slot. The plate between the outermost plates has a tongue with margins which fall along the inner margin of the slot.

16 Claims, 6 Drawing Sheets

5,413,658

FOLDING PLATE ASSEMBLY FOR FABRICATING HONEYCOMB INSULATING MATERIAL

RELATED APPLICATION

This is a continuation-in-part of U.S. application Ser. No. 07/773,843, filed Oct. 7, 1991, now U.S. Pat. No. 5,308,435 and application Ser. No. 07/870,574, filed Apr. 17, 1992, both entitled Method and Apparatus for Fabricating Honeycomb Insulating Material.

TECHNICAL FIELD

The present invention has its most important application in folding apparatus used in a production line for producing one or more stacks of secured together, flat, flexible expandable tubular strips from which expandable honeycomb panels of a desired overall width and expandable length can be cut. The fabricators then assemble the pleated panels with various hardware, like support rails and pull cords, to form the completed assembly which is installed in the user's homes to cover windows and other openings.

BACKGROUND OF THE INVENTION

The production lines for producing stacks of honeycomb material in recent years have used various folding apparatus designs for folding the opposite longitudinal edge portions of a web usually made of a thermoplastic material over the central portion thereof. The web to be folded is unwound from a roll of the web material and is advanced through the folding apparatus of the production line by one or more driven rollers following the folding apparatus. The driven rollers press the web against freely rotatable rollers or a heating drum. The folds are set by pressing the folded web against the surface of the heating drum. The folded web is then cooled, coated with adhesive, and either spirally wound around a rotating or stationary rack, or cut into strips. In the latter case, the strips are sequentially pushed into a stacking chamber where the strips are secured together by the adhesive coating on the strips to form an expandable stack of secured together honeycomb panel-forming strips. When the adhesive coated web is wound on a rack, the opposite sides of the wound web are severed to form two secured together stacks of honeycomb panel-forming strips.

Various different types of folding apparatus have heretofore been used to fold the longitudinal edges of the web. One such apparatus is disclosed in U.S. Pat. No. 4,450,027 to Colson where the folding apparatus folds the web progressively around the bottom margins of a series of rollers having a rectangular profile. Another apparatus for folding a web is disclosed in application Ser. No. 07/839,600, filed Feb. 21, 1992, now U.S. Pat. No. 5,334,275, where the web is folded around a shoe by a series of pairs of canted rollers.

U.S. application Ser. Nos. 07/773,843, now U.S. Pat. No. 5,308,435, and 07/870,574 disclose a unique web folding apparatus over which the present invention is an improvement. The folding apparatus disclosed in these applications comprise a single folding plate having a slot therein through which the web passes. The slot has a base portion through which the central portion of the web passes, and short reversely curved slot portions at the ends of the base portion which join upwardly extending outer end slot portions which guide the opposite longitudinal edge portions of the web toward each other. The slot width desirably should usually be narrower than twice the thickness of the web to prevent fold-over of the web within the slot. The upwardly folded web is then flattened against the heated surface of the rotating heating drum and subsequently fed to cooling, adhesive-coating, web cutting and strip-stacking apparatus as above described.

The web material used in the various production lines which manufacture honeycomb material is shipped by the web supplier in the form of large rolls of such material. The supplier splices together shorter lengths of the web material using splicing strips bridging the near abutting edges of initially separate lengths of web material. The thickening of the web and splicing strip assembly where the adjacent lengths of the web material are spliced together sometimes can cause the web and strip assembly to get jammed in the desirably narrow slot of the single folding plate. This causes breakage of the web by the feeding force applied to the web and undesired stoppage of the production line.

SUMMARY OF THE INVENTION

The folding plate assembly of the present invention provides a jam-proof slot through which a spliced web passes. To avoid jamming of spliced portions of a web, even when the splice increases the thickness of the spliced portion of the web to a point greater than the slot width, the desired slot is formed by three longitudinally spaced plates which form longitudinally spaced margins of an overall slot. The outermost of the plates have aligned apertures whose perimeters fall along the outer margins of the desired overall slot. The plate between the outermost plates, referred to and the intermediate plate, has a tongue having a perimeter which falls along the inner margins of the desired overall slot.

The plates are preferably part of an assembly which includes spacer plates between the intermediate and outermost plates. The entire assembly is bolted together to form an integral assembly. This assembly, in turn, is desirably mounted for progressive horizontal longitudinal and lateral adjustment to vary the spacing of the folding plate assembly with respect to idler rollers positioned on opposite sides of the folding plate assembly. These adjustments vary the fold width over narrow limits and center the folded web with respect to the heating drum.

DESCRIPTION OF PREFERRED EXEMPLARY FORM OF THE INVENTION

Figure 1:
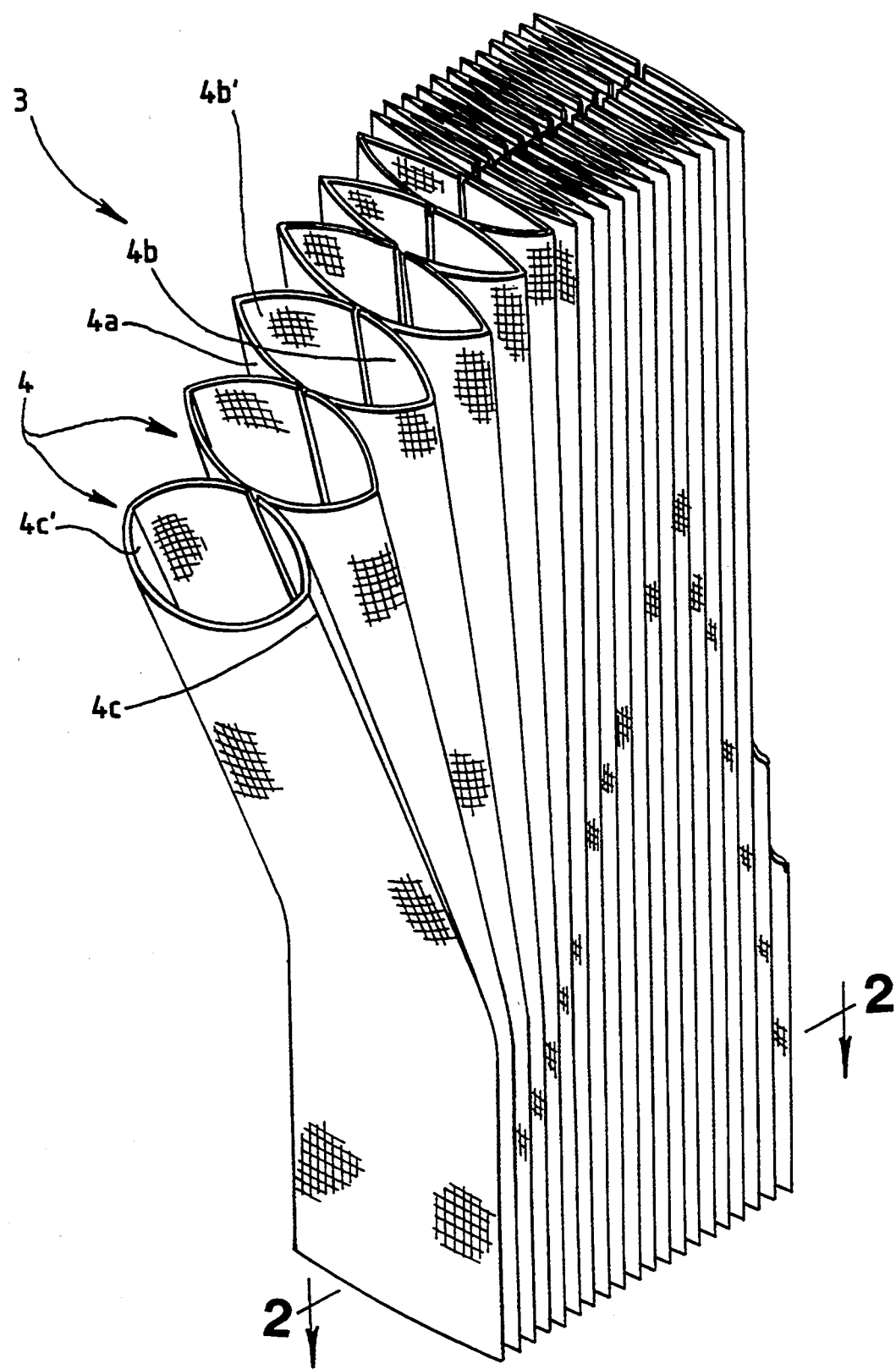
FIG. 1 is a perspective view of a part of one of the stacks of expandable honeycomb insulation material made by the apparatus disclosed in FIGS. 3–12.
Figure 2:
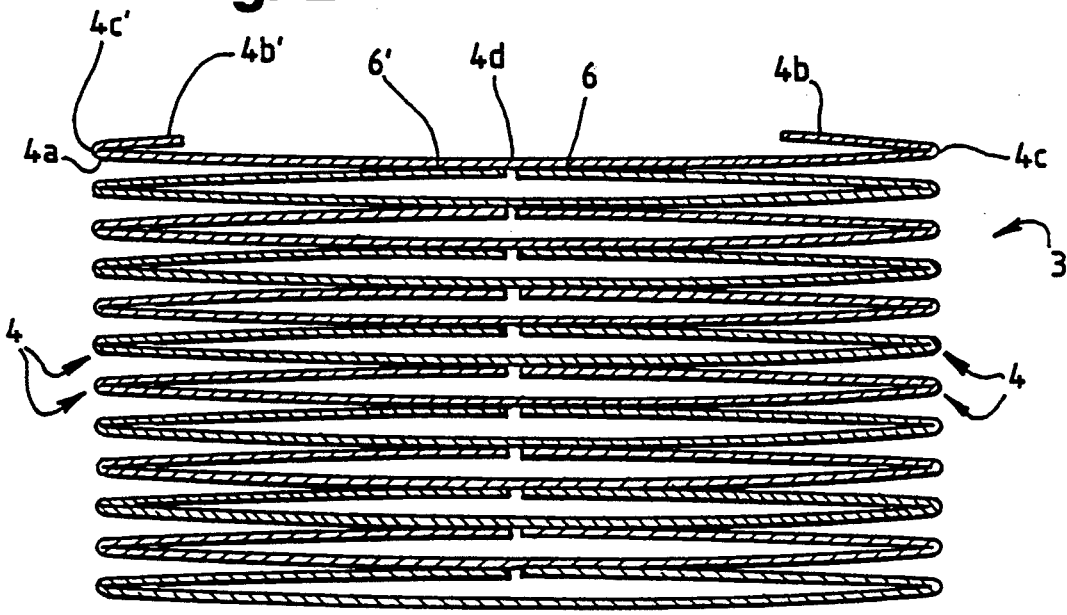
FIG. 2 is a transverse section through the stack of FIG. 1, taken along section line 2—2 therein.

FIGS. 1 and 2—The Product Made by the Present Invention

FIG. 1 is a perspective view of a part of one of the stacks 3 of expandable honeycomb insulation material made by the method and apparatus of the present invention, where the expandable honeycomb material is of the form disclosed in Dutch Application Serial No. 6,508,988 of Landa, published Jan. 13, 1967. As shown in FIG. 1 herein, the stack 3 is made up of individual folded strips 4 of flexible material each forming a flattened, expandable tube when secured to the next strip by bands 6–6' of adhesive. The strips as illustrated are preferably formed from an initially unfolded web whose opposite longitudinal edge portions are preferably folded over at 4c–4c' by the unique folding plate assembly of the invention into contiguous but spaced relation, to form permanently tightly folded over panels 4b–4b' overlying a bottom panel 4a. The strips 4 are cut from this web preferably after the bands 6–6' of adhesive are applied to the top portion of the web. The bands 6–6' of adhesive are applied only to the confronting end portions of the folded over panels 4b–4b'.

Figure 3:
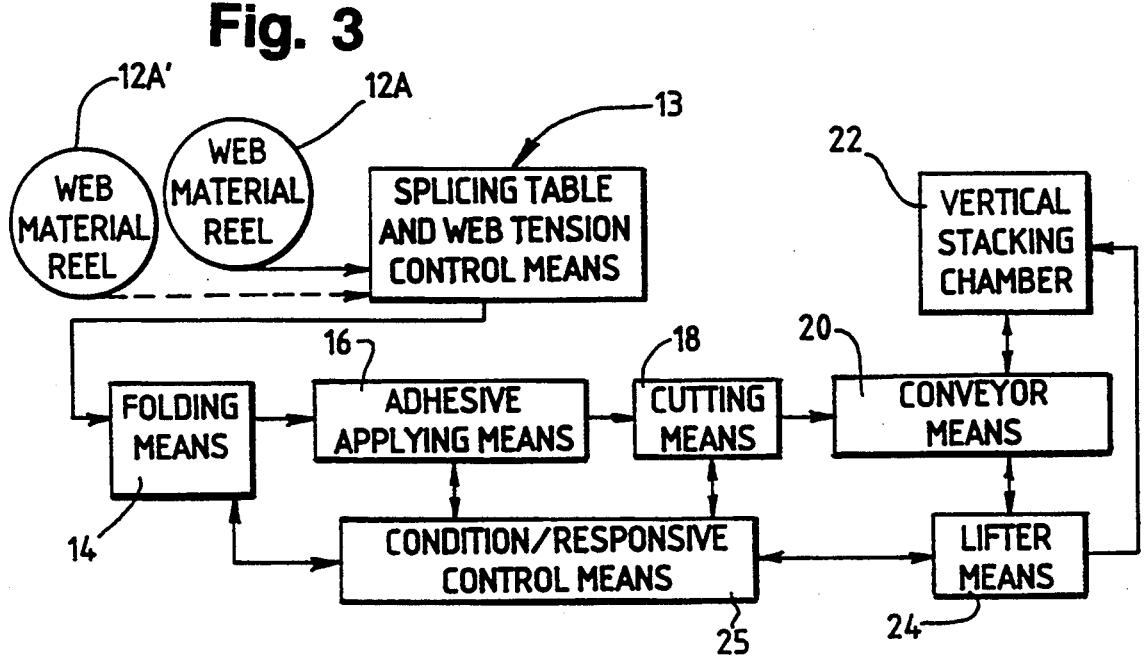
FIG. 3 is a block diagram showing the basic apparatus elements for making the stack of material shown in FIGS. 1 and 2.
Figure 4:
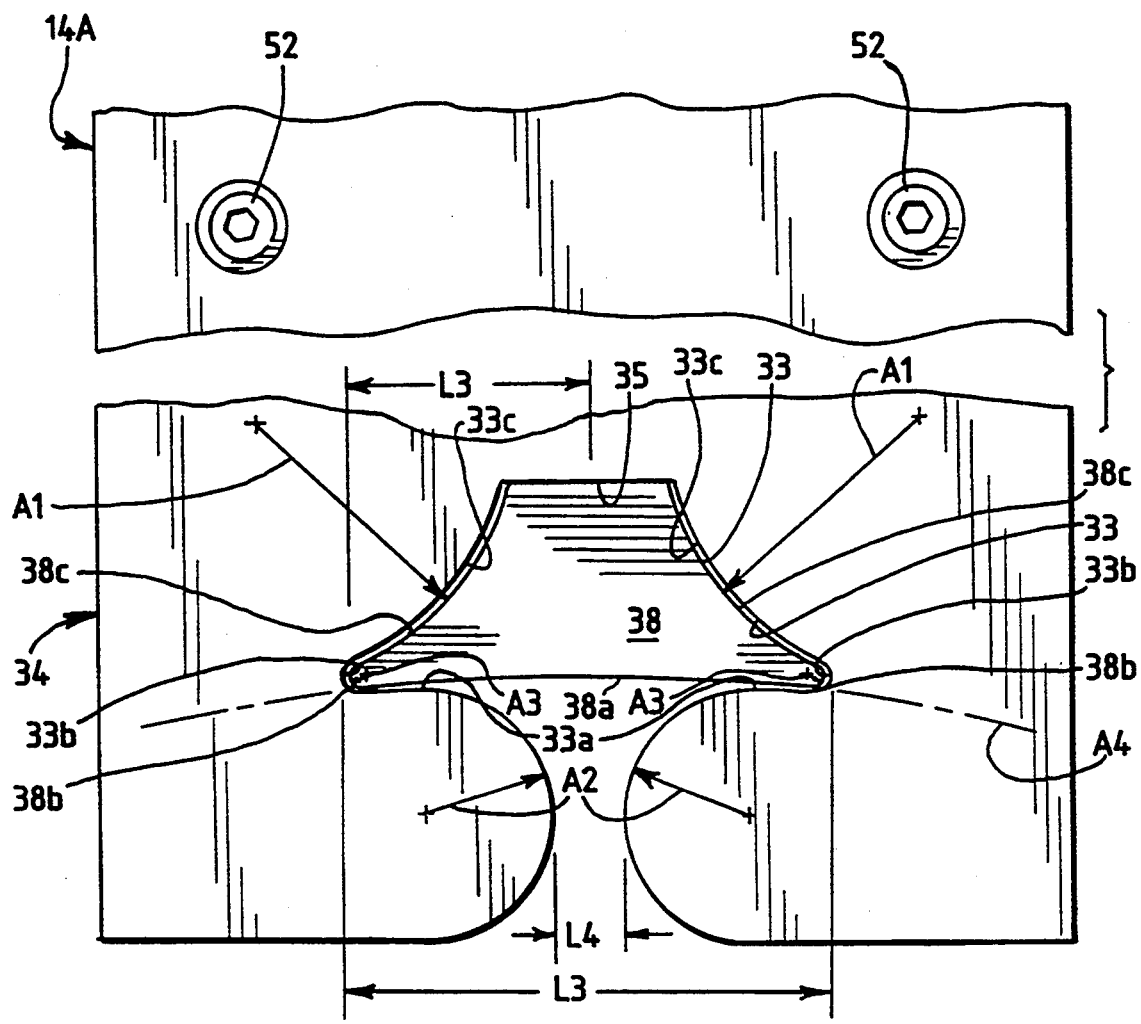
FIG. 4 is an elevational view of the folding plate assembly of the invention viewed without the web passing therethrough, and in a plane facing the direction of movement of the web through the slot formed by the assembly.

FIG. 3—Basic Block Diagram of the Production Line Used to Make the Stack 3 of FIGS. 1 and 2

Before describing in detail the unique folding plate assembly of the invention, the environment in which the present invention has its most important application will be described in connection with the block diagram of FIG. 3.

FIG. 3 illustrates the basic apparatus elements used in the preferred production line for manufacturing the stack 3 shown in FIGS. 1 and 2. A support structure is preferably provided for supporting two reel-mounted rolls 12A–12A' of unfolded continuous, flexible preferably thermoplastic web material of any desired construction, color and ornamentation used to form a honeycomb panel. These webs of material are respectively identified by reference numerals 13 and 13'. Only one of the reels 12A or 12A' is unwound at any time and threaded through the apparatus to be described. When the web material on one of the reels has been used up, the leading edge of the web of material wound on the other reel is spliced to the end of the web by a suitable thin colored tape (not shown) on a splicing table identified in part by the block 13. This table is disclosed in said co-pending applications Ser. Nos. 07/773,843 and 07/870,574. As previously explained, each roll of web material generally comes from the supplier with splicing strips 11 (FIG. 5) interconnecting initially separated lengths of the web material. For example, if the web 13 has a thickness of 0.006", and the splicing strip has a thickness of 0.044" the overall thickness of the web and splice strip at each splice point would be 0.050". This thickness obviously could cause the web to get stuck in a folding slot formed in a single plate.

As illustrated, the unfolded continuous web 13 or 13' of the roll 12A or 12A" following the splicing table passes through web tension control means identified in part by the block 13. This tension control means is also disclosed in said co-pending applications. The web is then fed to a folding means 14 including a slot folding plate assembly 14A shown in FIGS. 4–10. The overall slot formed by the assembly 14A can have an apparent width less than the overall thickness of the web 13 and splicing strip 11 and yet causes no jam of the web in the slot. The folding means 14 also includes a fold setting means preferably in the form of a heated drum 15 which heats the thermoplastic web material above its flowing temperature. The heated folded web is pressed against the drum to form sharp permanently set folds. A cooling means disclosed in said co-pending application then cools the pressed web below the setting temperature. The set folded web is then preferably fed to adhesive applying means 16 and then to cutting means 18 which cuts individual, flat tube-forming strips from the web.

The adhesive applying means 16 applies the adhesive bands 6–6' shown in FIGS. 1–2 to the spaced inner end portions of the folded over panels 4b–4b' preferably as a pair of continuous bands at the ends of the folded over portions of the web. The adhesive material is preferably an initially liquid thermosetting adhesive which sets partially in a relatively short period of time so that adjacent strips will be secured together to a sufficient degree when removed from the stacking chamber to be described, that they can withstand the rigors of subsequent handling. The adhesive sets completely over a long period of time to withstand the much greater pulling forces which are present when the panels cut from the stack of strips produced by the invention are cut into honeycomb panels of a desired length assembled with support rails and pull cords installed over windows and expanded and contracted many thousands of times by the owners thereof in the useful life of the panels.

Various feed and guide rollers forming a part of the tension and alignment control, and folding apparatus, adhesive applying means and cutting means constitute conveyor means which deliver the individual strips to a higher speed conveyor means 20 referred to in some of the claims as a second conveyor section. This second conveyor section operates at as much as twice the speed the linear speed of the feed rollers associated with the first conveyor section, so that the strips 4 cut from the folded web are conveyed to the inlet station of a vertical stacking chamber 22 at spaced time intervals. This permits a strip delivered to the inlet station of the stacking chamber to be stacked in the vertical stacking chamber 22 by a lifting means 24, sometimes also referred to as pusher means, which moves from an initial lowered position to a raised position and then back to a lowered position before the next strip is delivered to the inlet station.

The bottom of the vertical stacking chamber 22 is defined by a pair of laterally-spaced support shoulders which form a strip pass-through slot in the floor of the stacking chamber. The lifting means 24 may include an elongated bar raisable through the slot at the instant of time the strip becomes aligned with the slot and the strip or strips in the stacking chamber, to push the strip into the chamber preferably to an extent to raise the stack of strips above it. In so doing, the adhesive bands 6–6' which have not yet completely dried, are effectively pressed against the bottom panel 4a of the strip above it to adhere the two adjacent strips together. The drying time of the adhesive is sufficient that the strips are securely adhered by the time each stack of strips is removed from the stacking chamber.

To aid in the securement of adjacent strips together, a downward force is also preferably applied to the top of the stack involved. This is produced by a weight-forming bar or by the weight of the various strips in the stacking chamber above the bottom strip being moved into the stacking chamber.

Folding Means 14 Shown in FIGS. 4–9.

Figure 5:
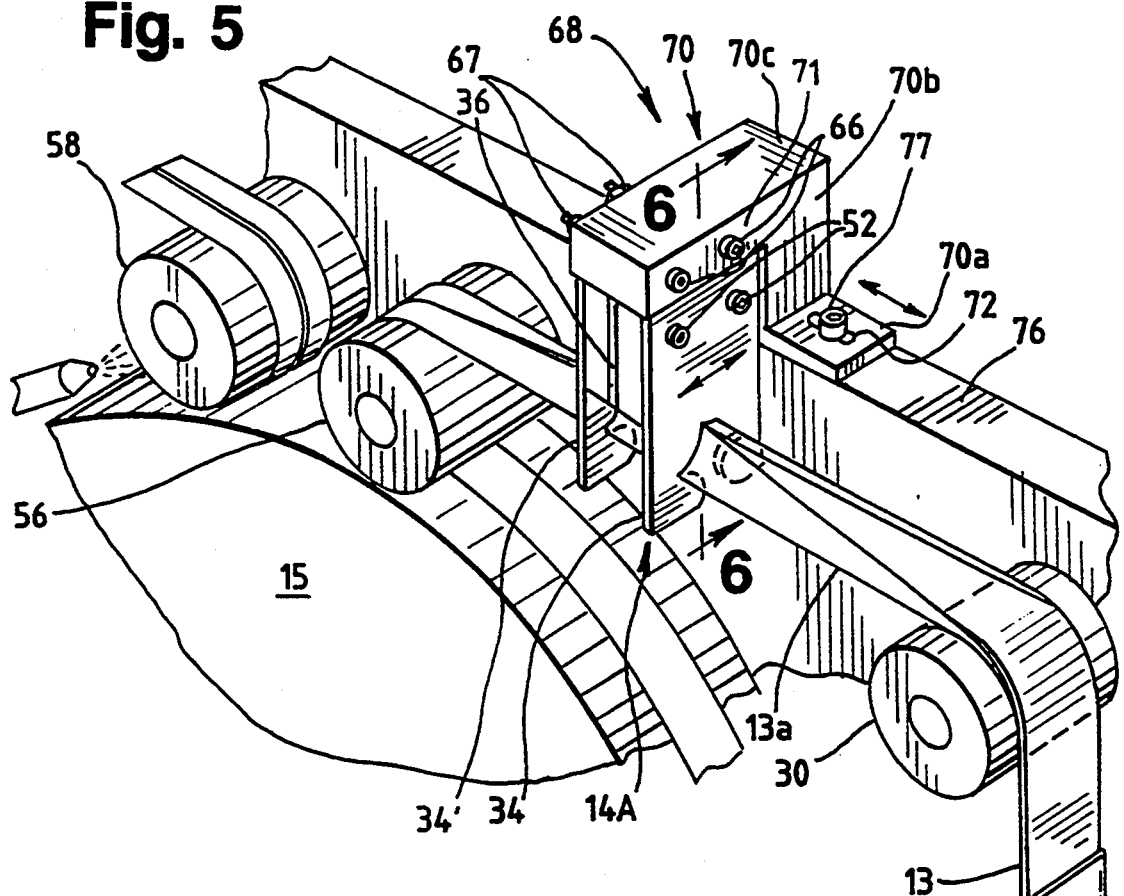
FIG. 5 is a perspective view of the folding plate assembly of the invention and its support structure located between idler rollers guiding a web having a splicing strip bridging a pair of web sections at a point in front of the folding plate assembly of the invention through which the web is fed.
Figure 6:
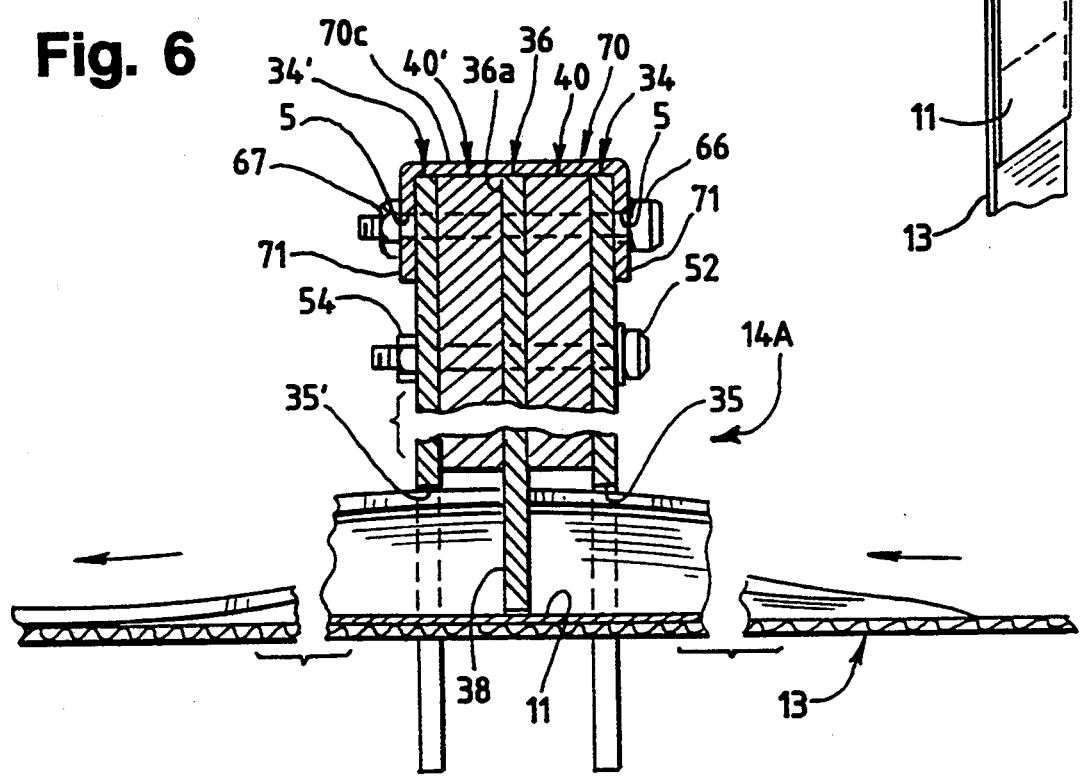
FIG. 6 is a vertical sectional view through the folding plate assembly shown in FIG. 5, taken along section line 6—6, the spliced web section being shown in a different position than shown in FIG. 5, namely a position where the spliced portions of the web is passing through the folding plate assembly.

Refer now more particularly to FIG. 5. Shown therein is a spliced portion of a web 13 being delivered from the splicing table and web tension control means to an overall slot formed by the folding plate assembly 14A of the invention. The spliced, still unfolded portion of the web 13 is shown approaching an idler roller 30. Initially separated portions 13—13 of the web are shown interconnected by a splicing strip 11 which forms a combination web and splicing strip obviously much thicker than the thickness of each of the web sections 13. As previously indicated, the folding plate assembly 14A forms what appears to be a slot 33 shown in the viewing plane of FIG. 4 facing the inlet side of the folding plate assembly 14A. The slot 33 has a partially collapsed U-shaped configuration and includes a generally horizontally extending bottom portion whose bottom margin is defined by the bottom side portions 33a—33a of a large aperture 35 (FIG. 11) formed in a front outermost metal 25 plate 34 and by the bottom side portion 33a'—33a' of a large aperture 35' in a rear outermost metal plate 34' longitudinally spaced from the plate 34. The inner or upper margins of the bottommost portion of this slot is defined by the bottom edge or margin 38a of a tongue 38 projecting from the bottom of a main body portion 36a of an intermediate metal plate 36 located between the outermost plates 34–34'.

The bottom portion of the overall slot 33 terminates in reversely curved portions whose outer margins are defined by reversely curved portions 33b—33b and 33b'—33b' respectively of the apertures 35 and 35' of the outermost plates 34 and 34'. The inner margins of these reversely curved portions of the slot are defined by the curved end portions 38b—38b of the tongue 38 of the intermediate plate 36.

The reversely curved portions of the slot respectively join upwardly angled and oppositely curved upper slot portions whose outer margins are defined by the side margins 33c—33c and 33c'—33c' of the outermost plates 34 and 34'. The innermost margins of these oppositely curved upper portions of the slot are defined by the upwardly facing margins 38c—38c of the tongue 38 of the intermediate plate 36.

The outermost and innermost margins of the overall slot produced by the folding plate assembly 14A are respectively formed by relatively closely longitudinally spaced portions of the large apertures 35–35' and tongue 38 of the plates 34–34' and 36. There is thus provided what appears to be a narrow slot, but with clearance spaces inward of the margins of the plate apertures 35–35' and outward of the margins of the tongue 38, to prevent jamming of the web in the overall slot joined by the folding plates 34, 34' and 36. These clearance spaces are shown in FIGS. 9 and 10, to which reference should now be made.

Figure 9:
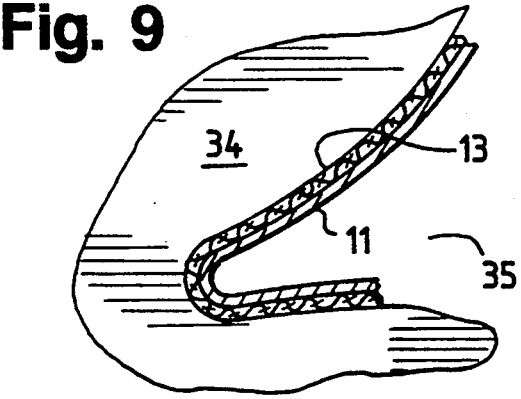
FIG. 9 is a vertical sectional view through the folding plate assembly taken in a viewing plane immediately in front of the front outermost plate of the folding plate assembly, the figure illustrating the clearance space provided by the aperture in the outermost plate for the splicing strip-thickened portion of the web; and, FIG. 10 is a vertical sectional view through the folding plate assembly, taken in a viewing plane in front of the intermediate plate of the folding plate assembly, the figure showing the clearance space provided beyond the tongue projecting from the intermediate plate for the splicing strip-thickened portion of the web being folded.

FIG. 9 is a transverse vertical sectional view through a spliced portion of the web as it passes through the slot formed by the folding plate assembly 14A, and as viewed in a vertical plane immediately in front of the front plate 34. The same sectional view would appear in the vertical plane immediately in front of the rear plate 34'. As thereshown, the splice thickened portion of the web has complete clearance afforded by the large apertures 35 and 35' in the plates 34 and 34'.

Figure 10:
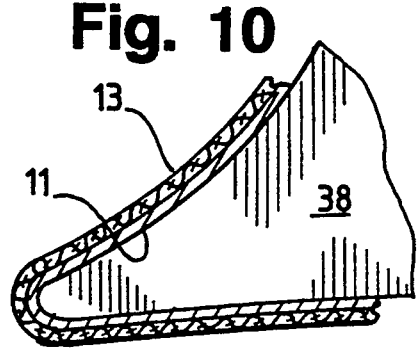

FIG. 10 is a traverse vertical sectional view through the spliced portion of the web viewed in the plane immediately in front of the intermediate plate 36 from which the tongue 38 extends. There is obviously complete clearance for the spliced portion of the web in the space beyond the margins of the tongue 38.

The defining walls of the plate apertures 35 and 35' envelope the outside surface of the web material to exert lateral forces inward on the web as it travels through the slot defined by the inside margins of the plate apertures 35 and 35' and the margins of the tongue 38 of the intermediate plate.

The tongue 28 of the intermediate plate 36 exerts forces outward, counter acting the action of the defining walls of the apertures 35–35'. The perimeter length of the slot created by the stacked plates should be slightly less than the width of the web, so that a fold centering consistency remains constant.

Moreover, as previously indicated, the width of the slot defined by the margins of the folding plate apertures 35–35' and the tongue 38 should be less than double the thickness of the web as to not allow the web to fold over on itself. The two spacer plates 40 and 40' separating the three folder plates 34-34'-36 should be of small thickness as to maintain control on the fold width variation, while allowing for splices which make the spliced portions of the web thicker without jamming the folding plate assembly. In one example, the folding plates were 0.125" thick, and the spacer plates were 0.125" thick.

For a folding plate assembly of these dimensions which is to fold a web 2.281" wide when unfolded, 0.006" thick and a fold width which produces a folded web 1.125" wide, the dimensions of the overall slot produced by the plate apertures 33 and 33' and tongue 38 to produce the best results in a fabric web material No. 5040, manufactured by Asami are as follows:

Width of slot—0.011"

Total length of inside perimeter of slot—2.200"

Radius of arc A1 (FIG. 4) at inside margin of slot—0.500"

Radius of arc A2—0,230"

Radius of arc A3 at inside margin of slot—0.031"

Radius of arc A4—5.0"
Dimension L3—1.102"
Dimension L4—0.125"

Figure 7:
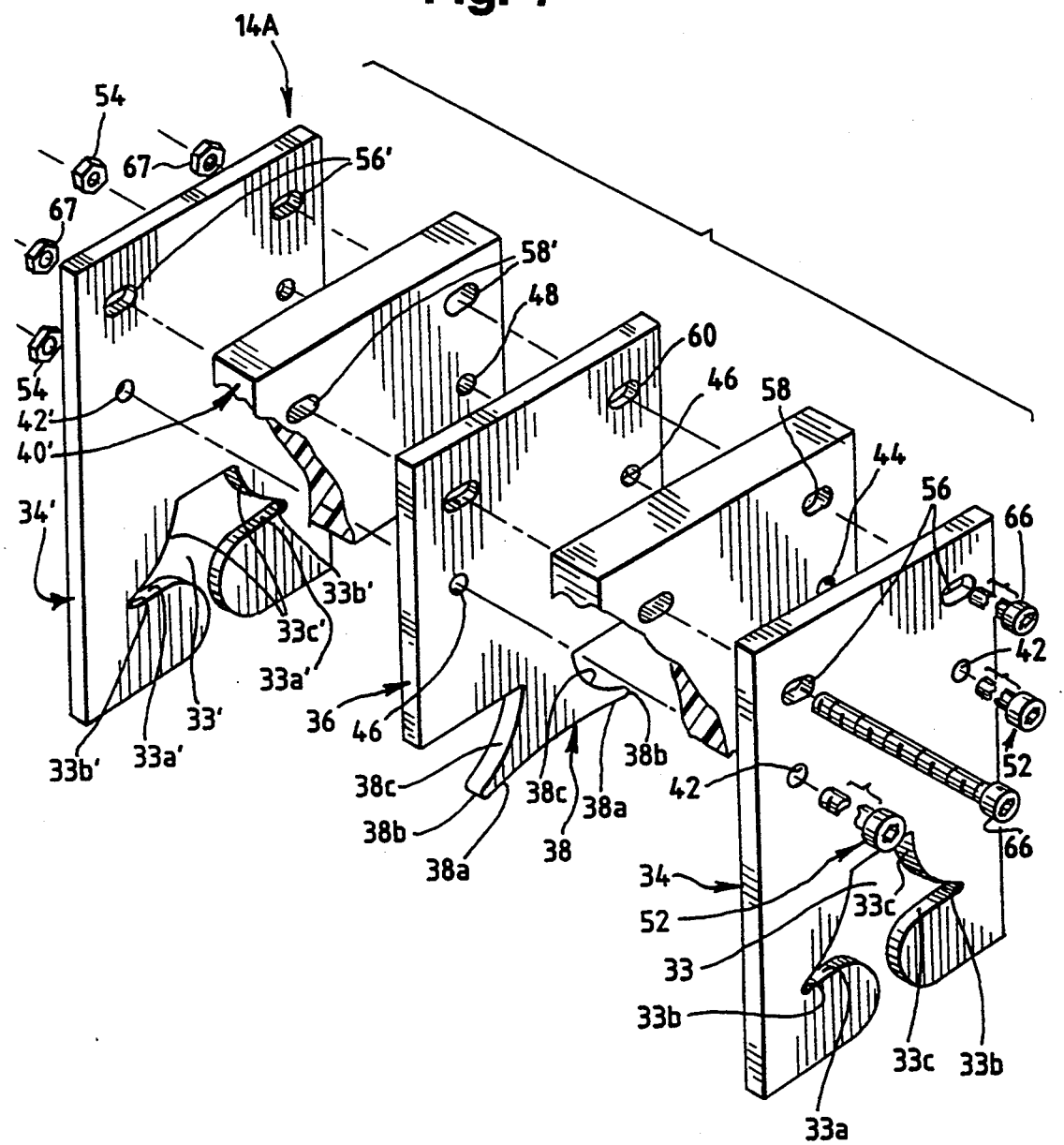
FIG. 7 is an exploded view of the folding plate assembly of the invention.
Figure 8:
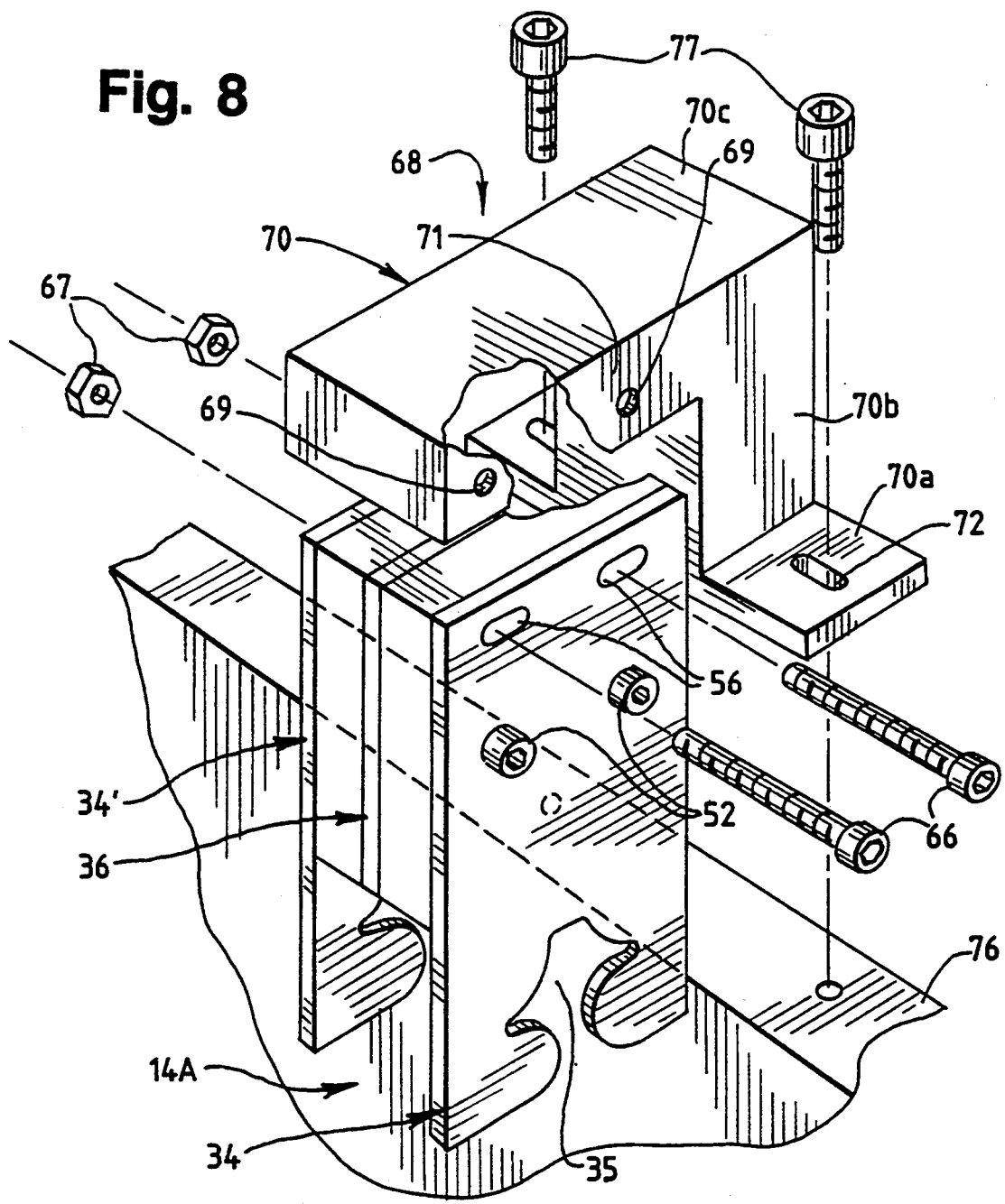
FIG. 8 is an exploded view of the support structure for the folding plate assembly, and shows the various slotted and apertured portions of the folding plate assembly and its support structure which provide for the positional adjustment of the assembly.

The plates 34-34' and 36 preferably form part of an integral secured together plate assembly. To this end, as best shown in FIGS. 7 and 8, spacer plates 40 and 40' are respectively provided between the intermediate plate 36 and the outermost plates 34 and 34'. The assembly of all of these plates are held together by bolts 52 each passing through aligned apertures 42, 44, 46, 44' and 42' formed, respectively, in the plates 34, 40, 30 36, 40' and 34'. Nuts 54 and 54 thread around the ends of the bolts 52 and 52.

The folding plate assembly 14A is mounted on a support structure to be described for horizontal movement in a direction transverse to the direction of movement of the web through the folding plate assembly before horizontal adjustable movement between a pair of idler rollers 30 and 56. The web 13 moves around the idler roller 30 and then passes into the overall slot defined by the folding plate assembly 14A which causes the longitudinal sides of the web to be folded upwardly as best shown in FIG. 5. The web leaving the folding plate assembly then passes around an idler roller 56 located opposite the top surface of a heating drum 15. The support structure now to be described also supports the folding plate assembly 14A for movement toward and away from the idler rollers 30 and 56. This varies over a narrow range with width of the fold so as to precisely adjust the final width of the folded web when the folds in the web are set by its movement around the heating drum 15. As shown in said co-pending applications, there are a series of pressure rollers (not shown) extending around the drum 15 which press the folded web against the heated surface of the drum. The folded web on the far side of the drum then passes around the surface of a driven roller 58. The various rollers referred to may be mounted to provide an adjustable pressure between the rollers and the heating drum. The driven roller 58 provides the drive force for rotating the heating drum 15 and pulling the web through the folding plate assembly 14A.

The support structure supporting the folding plate assembly 14A for horizontal longitudinal and lateral adjustment includes a support bracket 70. The support bracket 70 has a bottom slotted leg 70a extending longitudinally from a vertical arm 70b terminating in a head portion 70c. The head portion 70c has spaced front and rear flanges 71 having aligned circular apertures 69 for receiving the shanks of a pair of anchoring bolts 66. The shanks of the anchoring bolts 66 pass through pairs of horizontally elongated slots 56, 58, 60, 58' and 56' respectively formed in the upper extremities of the folding assembly plates 34, 40, 36, 40' and 34'. The folding plate assembly 14A, due to the latter slots is laterally horizontally adjustable on the bolt shanks and is locked in an adjusted position for proper centering of the folding plate assembly by the tightening of a pair of the nuts 67 threading over the ends of the shanks of the bolts 66 on the outer face of one of the flanges 71 (see FIG. 6).

The folding plate assembly 34 carried by the support bracket 70 is shiftable in the direction of movement of the web through the folding plate assembly 14A by the provision of a longitudinally extending slot 72 in the leg 78a of the support bracket 70 and a locking screw 77. The shank of the screw passes through the slot 72 and threads into a rail 76. The screw 77 is tightened to lock the support bracket 70 in a desired longitudinal position between the idler rollers 30 and 56.

If the folding plate assembly is moved closer to the idler roller 56 adjacent to the heating drum 15, the folds become progressively wider. If the folding plate assembly is moved away from the idler roller 56, the folds become progressively narrower. The adjustment of the fold width which determines the ultimate width of the folded web can only be adjusted over a very narrow range, since the overall length of the slot defined by the folding plate assembly 14A and the initial width of the unfolded web are very similar. The dimensions previously given for the overall length of the slot formed by the folding plate assembly and the width of the unfolded web provide the desired degree of adjustment which is measured in thousandths of an inch.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

We claim:

1. A folding apparatus for folding a web of sheet material of a given thickness moving along a given path, said web having parallel longitudinal edges and a given fixed consistent width, said folding apparatus comprising three confronting, substantially parallel plates spaced along a given longitudinal axis and forming an overall slot wherein the outer margin of the overall slot is defined by apertures in the outermost plates and the innermost margin of the overall slot is defined by a portion of the plate between the outermost plates, said overall slot including a base portion through which the central portion of the web can pass, and short reversely curved slot portions at the ends of the base portion which join outer end slot portions and through which outer end slot portions the longitudinal edge portions of the web can pass so as to be folded over the central portion of the web, the outermost of said plates respectively having aligned apertures whose margins fall along the outer margins of said overall slot and the plate between said outermost plates constituting an intermediate plate having a projecting tongue with a perimeter which falls along the inner margin of said overall slot.

2. The folding apparatus of claim 1 wherein said slot has an inlet side into which the web is fed and an outlet side from which the web leaves said slot, said apparatus combined with a first idler roller spaced from the inlet side of said slot and around which the unfolded web passes in its path of movement to the inlet side of said slot, and a second idler roller spaced from the outlet side of said slot around which the folded portion of the web leaving said slot extends, said second idler roller pressing the folded web against a backing surface to form a flattened folded web.

3. The combination of claim 2 wherein said plates are interconnected to form an integral folding plate assembly, and a support structure for said folding plate assembly including means for progressively adjusting the position of said folding plate assembly between said first and second idler rollers, said position adjusting the width of the folds and the precise width of the finally folded, flattened web.

4. The combination of claim 1 wherein said slot has an overall length similar to but smaller than the width of the desired web to be folded thereby.

5. The folding apparatus of claim 1 where the apparent width of said overall slot is greater than the said given thickness of the web and less than twice said given thickness of said web.

6. The folding apparatus of claim 1 combined with a heated drum surface around which said folded web is pulled and pressed, to set sharp permanently set folds in a web made of thermoplastic material.

7. The folding apparatus of claim 1 wherein said slot has a partially collapsed U-shape.

8. The folding apparatus of claim 1 wherein said outer end slot portions are converging, outwardly curving slot portions.

9. The folding apparatus of claim 1 wherein the defining walls forming the inner margins of said reversely curved portions of the slot have rounded profiles formed by said tongue to avoid slitting the web material.

10. The folding apparatus of claim 1 wherein said intermediate plate includes a main body portion from which said tongue projects, said main body portion of said intermediate plate being located beyond the apertures of said outermost plates and a pair of spacer plates filling the space between said intermediate and outermost plates.

11. The folding apparatus of claim 10 provided with connectors extending between said plates for holding the same together to form a folding plate assembly.

12. The folding apparatus of claim 1, wherein in some cases the web can be a web formed by web sections spliced together by splice pieces which thicken the web at the spliced sections of the web, and said overall slot has a width measure between the opposite margins of the overall slot which is less than the thickness of said spliced sections of the web.

13. The folding apparatus of claim 1 or 12 wherein said overall slot has a length similar to the width of the unfolded web.

14. A method of folding a web of sheet material of a given thickness moving along a given path, said web having parallel longitudinal edges and a given fixed consistent width, the method comprising the steps of providing folding apparatus including three confronting, substantially parallel plates spaced along a given longitudinal axis and forming an overall slot wherein the outer margin of the overall slot is defined by apertures in the outermost plates and the innermost margin of the overall slit is defined by a portion of the plate between the outermost plates, said overall slot having a base portion through which the central portion of the web can pass, and short reversely curved slot portions at the ends of the base portion which join outer end slot portions and through which outer end slot portions the longitudinal edge portions of the web can pass so as to be folded over the central portion of the web, the outermost of said plates respectively having aligned apertures whose margins fall along the outer margins of said overall slot, and the plate between said outermost plates constituting an intermediate plate having a projecting tongue with a perimeter which falls along the inner margin of said overall slot.

15. The method of claim 14 wherein in some cases the web can be a web formed by web sections spliced together by splice pieces which thicken the web at the spliced sections of the web, and said overall slot has a width measured between the opposite margins of the overall slot which is less than the thickness of said spliced sections of the web.

16. The method of claim 14 or 15 wherein said overall slot has a length similar to the width of the unfolded web.

* * * * *